United States Patent [19]

DeMartino

[11] 4,285,750

[45] Aug. 25, 1981

[54] METHOD FOR PRODUCING A PLASTIC SLEEVE

[75] Inventor: Edward A. DeMartino, Perrysburg, Ohio

[73] Assignee: Owens-Illinois, Inc., Toledo, Ohio

[21] Appl. No.: 59,726

[22] Filed: Jul. 23, 1979

[51] Int. Cl.³ .......................... B29D 23/10; B65C 9/04
[52] U.S. Cl. .................................. 156/218; 156/449; 156/456; 156/DIG. 26; 156/DIG. 42
[58] Field of Search ............... 156/218, 82, 497, 450, 156/DIG. 21, DIG. 26, DIG. 36, DIG. 42, 449, 448, 456, 457, 458, 203

[56] References Cited

U.S. PATENT DOCUMENTS

| 2,585,250 | 2/1952 | Jones et al. | 156/449 |
| 3,200,027 | 8/1965 | Fairest | 156/449 |
| 3,802,942 | 4/1974 | Amberg et al. | 156/497 |
| 4,053,346 | 10/1977 | Amberg et al. | 156/497 |

Primary Examiner—William A. Powell
Assistant Examiner—Louis Falasco
Attorney, Agent, or Firm—David R. Birchall; Myron E. Click; David H. Wilson

[57] ABSTRACT

A sleeve forming apparatus wherein a rectangular sheet of thermoplastic material is formed into a tubular shape having overlapped end portions that are sealed together so as to minimize the lap thickness of the seam. Also disclosed is a method of forming a tubular shape wherein the seam area is worked to minimize its thickness while preserving its liquid-tight characteristics.

4 Claims, 1 Drawing Figure

METHOD FOR PRODUCING A PLASTIC SLEEVE

BACKGROUND OF THE INVENTION

For some time it has been common to manufacture drinking cups, other containers and plastic sleeves for bottles from expanded thermoplastic materials. A popular material currently in use for containers, etc. is expanded oriented polystyrene. A very popular container of this type is a cup that is molded directly from expandable polystyrene beads in a steam chest. However, cups formed in this manner must have a sidewall that is quite thick in comparison to, for example, paper. The added thickness of a cup formed by the molded steam chest method does not lend itself to a small stacking height, thus more space is required for a stack of a given number of cups. Then too, the inherent mode of manufacture of the steam chested cup prevents it being decorated to any degree until it is completely formed. The decoration of completed cups requires printing techniques that are slower and more expensive than flexographic and other sheet printing techniques employed on sheet stock which is preprinted prior to incorporation into containers or for sleeves used as a protective overwrap on glass containers such as bottles.

This invention is intended for use on plastic sleeve forming machines of the type disclosed in U.S. Pat. No. 3,970,492 issued to S. W. Amberg, et al on July 20, 1976, and U.S. Pat. No. 3,802,942 issued to S. W. Amberg, et al on Apr. 9, 1974. These machines are used to form sleeves from thermoplastic material by forming a rectangular sheet of material into a tubular shape having overlapping end portions and sealing the end portions together. The completed sleeves are then used to form either a thermoplastic cup or a shrink wrap covering for a glass container. In both of the above mentioned U.S. patents the seam is formed by heating the overlapping end portions of a formed tubular shape to soften their facing surfaces and pressing the end portions together to form a seam. The pressing is done by means of bar and results in a slight indentation in the area where the bar contacts the plastic material. The pressing action causes some distortion in the cellular structure of the thermoplastic material, with a resultant deterioration of insulative properties in the seam area. In U.S. Pat. No. 4,013,496 issued to S. W. Amberg on Mar. 22, 1977, the seam is formed by means of a spring loaded roller which presses against the overlapping edges of the tubular sleeve. Since the roller which forms the seam is spring loaded and the seam is formed basically by a pressing action, the thickness of the seam may be different from that of the remainder of the formed sleeve.

SUMMARY OF THE INVENTION

The present invention is directed to a method and apparatus for forming a seam on a cylindrical sleeve of thermoplastic material which has both a uniform thickness when compared to the remainder of the sleeve and whose insulative properties also conform substantially to those of the remainder of the sleeve. This is accomplished by means of a curvelinear sealing plate section positioned at a fixed location along a peripheral path of a series of vertically disposed rotating sleeve forming mandrels mounted on a rotating turret. The overlapping seam edges are heated to fusing temperature and sealed together when the mandrel passes the sealing plate. The curved sealing plate meters a uniform thickness of the material through its arcuate path and a constant ironing or wiping pressure is applied at the seam area, the ironing process results in a uniform bonding of the two surfaces which form the seam. The length of the sealing plate can be such that the mandrel will complete several rotations as it passes by the plate, thus causing the seam ironing process to be repeated several times. The position of the curved sealing plate is adjustable for different material thicknesses, and the thickness of the seam conforms very closely to that of the remainder of the sleeve sheet material. In addition, the wiping process results in minimal disturbance of the cellular structure of the thermoplastic material, thus retaining the insulative properties of the material at the seam location.

BRIEF DESCRIPTION OF THE DRAWINGS

The FIGURE is a perspective view of a sleeve winding apparatus which shows the mandrels and the sealing plate.

DETAILED DESCRIPTION OF THE INVENTION

Figure 1:
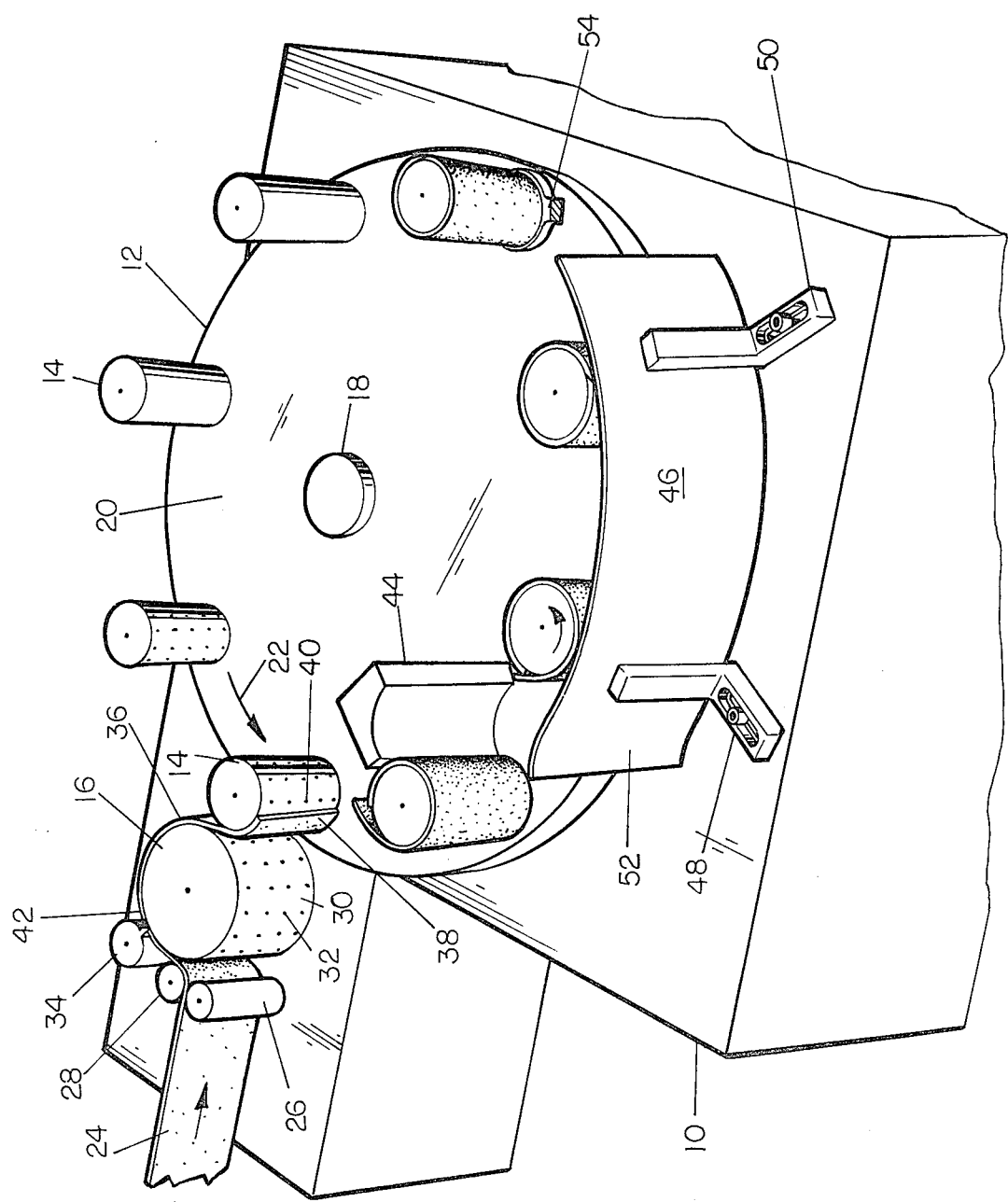

FIG. 1 of the drawings shows in general a simplified form the apparatus necessary in order to carry out the present invention. A base for the apparatus is shown at 10. The base 10 provides structure for a mandrel support turret 12 which carries an array of sleeve winding mandrels 14. Immediately adjacent the mandrel support turret is a feed drum 16 that delivers a measured length of plastic sheet material to each one of the sleeve winding mandrels 14.

More particularly, the base 10 provides the necessary structure for the mandrel support turret so that it may rotate about a central pivot 18. The mandrel support turret 12 is positioned so that its deck 20 is generally horizontal and the turret is capable of rotation in either direction. For purposes of this invention, the rotation of the mandrel support turret 12 is in the direction of arrow 22. Also, power to the turret 12 and other moving parts of the apparatus has not been shown since it is well within the skill of the ordinary person to visualize how each part could be powered.

Referring once again to FIG. 1, a web of plastic strip stock 24 is drawn through a pair of opposed feed rollers 26 and 28. The strip stock 24 is then directed around the exterior of a feed drum 16. The strip stock 24 is stabilized and held against the surface 30 of feed drum 16 by means of a vacuum applied through a plurality of vacuum ports 32 which are aligned over the surface 30 of feed drum 16.

As the strip stock moves around feed drum 16, a rotary knife 34 cuts the strip stock 24 into individual rectangular lengths, hereinafter referred to as blanks 36. The severed blank 36 is held against the surface of feed drum 16 by vacuum supplied through ports 32 until the leading edge 38 of blank 36 is in close tangential proximity with a sleeve winding mandrel 14. At this instant, the vacuum beneath the leading edge 38 is reversed to a positive pressure, thus releasing the leading edge 38 so that it may be picked up by the vacuum ports 40 located over the surface of the sleeve winding mandrel 14.

As the sleeve winding mandrel 14 rotates about its own axis by a drive means not shown, the blank 36 is completely transferred from the feed drum 16 to the sleeve winding mandrel 14. After the transfer of the blank 36 has been completed, the trailing edge 42 overlaps the leading edge 38 of blank 36 as shown in the drawings.

A plurality of sleeve winding mandrels 14 is circumferentially located on the top deck 20 of mandrel support turret 12. Each winding mandrel 14 received a blank 36 as the winding mandrel passes the feed drum 16.

As previously stated, the trailing edge 42 overlaps the leading edge 38 of blank 36. Heat is applied to both the inside and outside surfaces of the trailing edge 38 by a blower 44 which is positioned adjacent sleeve winding mandrel 14. While only one such blower 44 is shown in the drawings, it is to be understood that each one of the mandrels 14 has its own blower. A hot gaseous medium such as air is directed toward the trailing edge 42 which protrudes somewhat because it is not being held by the vacuum of mandrel 14. The hot gaseous medium exiting from blower 44 heats not only the exterior surface of trailing edge 42, but also the interior surface as well. In order to assist the hot gaseous medium exiting from blower 44, it is also possible to introduce a solvent spray either through blower 44 or by a separate spray system nearby to aid in conditioning the interior surface of the trailing edge 42 of blank 36 so that it will adhere to the exterior of the surface of leading edge 38.

As the sleeve winding mandrel 14 continues to move in an arcuate path along with the mandrel support turret 12, the mandrel 14 travels past a stationary sealing plate 46. Sealing plate 46 is curvilinear in shape and is mounted in an upright attitude from base 10. Sealing plate 46 is further made adjustable by the adjustment combination shown on adjustment support brackets 48 and 50. The sleeve winding mandrel 14 initially passes by an outwardly curved portion 52 of sealing plate 46 which provides a lead-in for the mandrel 14 and the blank 36 wrapped therearound. As the sleeve winding mandrel 14 continues to translate and rotate, the protruding trailing edge 42 of the blank 36 strikes the surface of sealing plate 46. The trailing edge 42 is firmly worked into the configuration of a cylinder as the mandrel 14 follows the remaining portion of sealing plate 46 which is arcuate in configuration and which is also concentric with the center of revolution of turret 12.

As has been just pointed out, mandrel 14 rotates about its own axis and at the same time, the entire mandrel 14 is being translated in an arcuate path being generated by the movement of the mandrel support turret 12. So long as the mandrel 14 rotation is as shown in the drawings, there will be a sliding or ironing of the blank 36 exterior against the surface of sealing plate 46. It would be possible and is considered within the purview of the present invention to reverse the direction of rotation of the mandrel 14 subsequent to its pickup of blank 36. Faster or slower rotation of mandrel 14 would produce a situation where blank 36 would partially roll and partially slide along the surface of sealing plate 46.

The adjustment brackets 48 and 50 provide for minute adjustments so that during the operation of the apparatus the sealing plate 46 can be held a particular preselected distance from the wall of the mandrel 12 at all points along its arcuate extent. The distance between the surface of the arcuate extent of sealing plate 46 and the external surface of mandrel 14 corresponds to a particular thickness of the plastic material which is utilized for the fabrication of a given sleeve from blank 36. The sealing plate 46 thus serves as a metering function in that only a particular thickness of sleeve material will be allowed to pass by the sealing plate 46 as mandrels 12 move by it. Since the area of the sleeve where the leading edge 38 and trailing edge 42 overlap will be greater than the desired thickness, the temperature or solvent softened material at the overlap of blank 36 will be ironed or wiped to the desired wall thickness of a finished sleeve. The softened ends of blanks 36 are thus caused to be fused together by the ironing effect of curved sealing plate 46.

As the mandrel support turret and its array of sleeve winding mandrels 14 continues to rotate, the finished sleeves are removed from the mandrels 14 by means of an ejector 54 which is positioned around the base portion of each mandrel 14. Once again, only one typical ejector 54 is shown in the drawings.

The finished sleeves are subsequently transferred to other machinery which utilizes the sleeves in affixing a protective wrap around a glass bottle or else utilizes the sleeve in the fabrication of an all plastic container such as a drinking cup.

What is claimed is:

1. In the method of making a tubular sleeve of thermoplastic sheet material including the steps of;
   (a) feeding a strip of sheet stock to a winding apparatus which includes a rotatable turret,
   (b) severing said strip into individual rectangular blanks each having a leading edge and a trailing edge,
   (c) forming each of said blanks into a cylindrically shaped sleeve by wrapping it around a mandrel,
   (d) overlapping the trailing edge of said blank so that it is exterior of the leading edge of said blank,
   (e) applying a softening medium to the edges of said blank, the improvement in the method of making a sleeve comprising the additional steps of;
   (f) moving said mandrel and its exteriorly positioned blank past an arcuate sealing plate, and
   (g) ironing the overlapped edges of said blank by the relative movement and contact between said sealing plate and said blank whereby the overlapped softened edges fuse together to form a smooth seam.

2. A method as set forth in claim 1 wherein the external surface of said sleeve traverses the curvilinear surface of said sealing plate by partial rolling and by sliding.

3. A method as set forth in claim 2 wherein the mandrel is rotating at an angular velocity greater than the orbital angular velocity of the turret.

4. A method as set forth in claim 2 wherein the mandrel is rotating at an angular velocity less than the orbital angular velocity of the turret.

* * * * *